United States Patent Office 3,312,737
Patented Apr. 4, 1967

3,312,737
PREPARATION OF ORGANOBORON COMPOUNDS
Robert J. Brotherton, Fullerton, and Lowell L. Petterson, Whittier, Calif., assignors to United States Borax & Chemical Corporation, Los Angeles, Calif., a corporation of Nevada
No Drawing. Filed Mar. 18, 1963, Ser. No. 266,018
2 Claims. (Cl. 260—551)

This invention relates to a novel method for preparing 5H,12H,19H - tris(benzo-1,3,2-diazaborolo)borazine and substituted 5H,12H,19H-tris(benzo - 1,3,2 - diazoborolo) borazines.

These compounds will be found to have utility as fuel additives and rocket fuels.

The present invention provides for the first time an authentic direct synthesis of a boron-nitrogen compound using boric acid or boric oxide as a reactant, and additionally presents for the first time exceptionally inexpensive starting materials for the production of such boron-nitrogen compounds. It is therefore the principal object of this invention to provide a new and economical method for the preparation of 5H,12H,19H-tris(benzo-1,3,2-diazaborolo)borazine and substituted 5H,12H,19H-tris (benzo-1,3,2-diazaborolo)borazines.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention provides the method of producing 5H,12H,19H-tris(benzo - 1,3,2 - diazaborolo)borazine and substituted 5H,12H,19H-tris(benzo-1,3,2-diazaborolo)borazines which comprises the reaction of a material selected from the group consisting of boric acid and boric oxide with an o-phenylenediamine having the formula

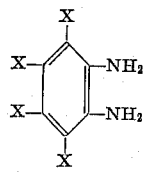

in the presence of an organic solvent inert to said reactants having a boiling point greater than 100° C., wherein X is selected from the group consisting of hydrogen, alkyl of 1 to 5 carbon atoms, alkoxy of 1 to 5 carbon atoms, and halogen, followed by isolation of 5H,12H, 19H-tris(benzo - 1,3,2 - diazaborolo)borazine and substituted 5H,12H,19H - tris(benzo-1,3,2-diazaborolo)borazines from the resultant reaction.

It will be clearly understood that the substituents on the o-phenylenediamine may all be the same or all different and the o-phenylenediamine may be substituted in any one or all or any combination of the 3, 4, 5, and 6 positions. The present borazines and substituted borazines are conveniently prepared by the present invention by heating boric acid or boric oxide with o-phenylenediamine in the presence of an organic solvent inert to the reactants and having a boiling point greater than 100° C. The reaction may be conducted with stoichiometric quantities of ingredients or an excess of the boric acid or boric oxide. As for the organic solvents which are applicable to the present invention, these may be any of the well-known aromatic or aliphatic hydrocarbons, toluene, xylene, dioxane, diethylene glycol monomethyl ether, diethylene glycol dimethyl ether, or diethylene glycol trimethyl ether, provided, of course, the solvents as discussed above are insert to the reactants and have a boiling point greater than 100° C.

The following equations are typical of the mechanism of the present invention:

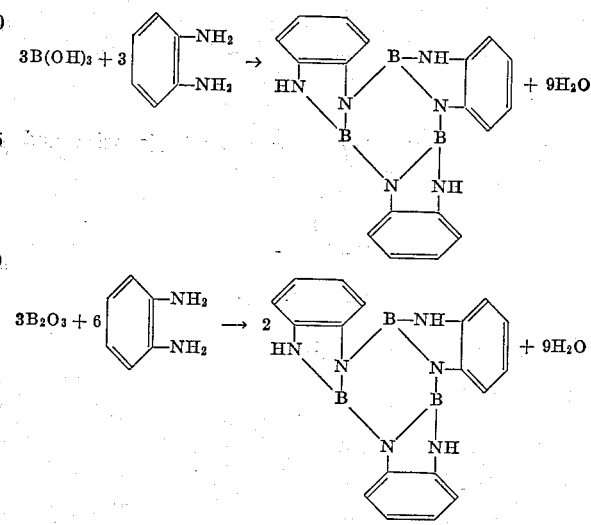

The first of the above equations represents the reaction involving boric acid, and the second equation is representative of the reaction involving boric oxide.

So that the present invention is more clearly understood, the following examples are given for illustrative purposes:

I

A mixture of 21.17 grams (0.196 mole) of o-phenylenediamine and 12.1 grams (0.196 mole) of boric acid was refluxed in toluene for about 131 hours. Approximately 80% of the theoretical water was collected in a Dean-Stark water trap. The reaction mass was filtered and the resultant solid product was dried and then sublimed. The final pure product resulting from the sublimation melted at a temperature above 360° C., its boron analysis was 9.55% (boron theory=9.4%), and the product had an infrared spectrum identical with that of an authentic same of 5H,12H,19H-tris(benzo-1,3,2-diazaborolo)borazine.

II

A mixture of 35.90 grams (0.332 mole) of o-phenylenediamine and 11.56 grams (0.166 mole) of boric oxide was refluxed in 300 ml. of xylene. The water which was evolved was collected and measured in a Dean-Stark water trap. After about 120 hours, approximately 80% of the theoretical water was obtained, the reaction mass was filtered and the resultant solid was dried. This product when sublimed resulted in a compound identical with the compound obtained in the foregoing example. The resultant purified 5H,12H,19H - tris(benzo-1,3,2-diazaborolo)borazine melted above 360° C., had a boron content of 9.52% (boron theory=9.4%) and showed an infrared spectrum identical with that of an authentic sample of 5H,12H,19H - tris(benzo - 1,3,2 - diazaborolo) borazine.

Other modes of applying the principle of the invention may be employed, change being made as regards the details described, provided the features stated in the following claim or the equivalent of such be employed.

We, therefore, particularly point and and distinctly claim as our invention:

1. The method of producing a compound of the formula

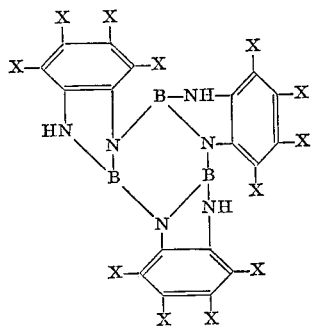

which comprises heating under reflux boric oxide and a phenylenediamine of the formula

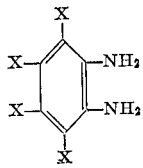

in the presence of an organic solvent inert to said reactants and having a boiling point greater than 100° C., where X is selected from the group consisting of hydrogen, alkyl of 1 to 5 carbon atoms, alkoxy of 1 to 5 carbon atoms and halogen, and separating said desired compound from the reaction mass.

2. The method of producing 5H,12H,19H-tris(benzo-1,3,2-diazaborolo)borazine which comprises heating under reflux boric oxide and o-phenylenediamine in an oxide:amine molar ratio of about 1:2 in the presence of an organic solvent inert to said reactants and having a boiling point greater than 100° C., and separating said borazine from the reaction mass.

References Cited by the Examiner

UNITED STATES PATENTS

| | | | |
|---|---|---|---|
| 2,948,751 | 8/1960 | Brotherton | 260—551 |
| 3,016,402 | 1/1962 | Harris | 260—551 |
| 3,045,038 | 7/1962 | Brotherton et al. | 260—551 |

OTHER REFERENCES

Brotherton et al.: J. Organic Chem., vol. 26, pp. 4632–4634, 1961.

WALTER A. MODANCE, *Primary Examiner.*

NICHOLAS S. RIZZO, *Examiner.*

E. E. BERG, HARRY I. MOATZ, *Assistant Examiners.*